(12) United States Patent
Cai et al.

(10) Patent No.: US 10,097,660 B2
(45) Date of Patent: Oct. 9, 2018

(54) SYSTEM AND METHOD FOR SUPPORTING DATA TYPE CONVERSION IN A HETEROGENEOUS COMPUTING ENVIRONMENT

(71) Applicant: Oracle International Corporation, Redwood Shores, CA (US)

(72) Inventors: Jimin Cai, Beijing (CN); Xiangdong Li, Beijing (CN); Lipeng Wang, Beijing (CN); Todd J. Little, Palatine, IL (US)

(73) Assignee: Oracle International Corporation, Redwood Shores, CA (US)

( * ) Notice: Subject to any disclaimer, the term of this patent is extended or adjusted under 35 U.S.C. 154(b) by 428 days.

(21) Appl. No.: 14/639,266

(22) Filed: Mar. 5, 2015

(65) Prior Publication Data

US 2015/0278272 A1 Oct. 1, 2015

Related U.S. Application Data

(60) Provisional application No. 61/971,273, filed on Mar. 27, 2014.

(51) Int. Cl.
*G06F 17/00* (2006.01)
*H04L 29/08* (2006.01)
*G06F 17/30* (2006.01)
*G06F 9/54* (2006.01)

(52) U.S. Cl.
CPC .......... *H04L 67/2842* (2013.01); *G06F 9/541* (2013.01); *G06F 17/30371* (2013.01); *G06F 17/30569* (2013.01); *G06F 17/30893* (2013.01); *H04L 67/2823* (2013.01)

(58) Field of Classification Search
CPC .... G07F 11/002; G07F 17/0014; G07F 17/16; G07F 7/00
See application file for complete search history.

(56) References Cited

U.S. PATENT DOCUMENTS

2003/0058277 A1* 3/2003 Bowman-Amuah ....................... G06F 17/30607
715/765

OTHER PUBLICATIONS

European Patent Office, International Searching Authority, International Search Report and Written Opinion dated May 22, 2015 for International Application No. PCT/US2015/022829, 10 pages.

(Continued)

*Primary Examiner* — Truong Vo
(74) *Attorney, Agent, or Firm* — Tucker Ellis LLP

(57) ABSTRACT

A system and method can support a transactional system in a heterogeneous computing environment. The transactional system can provide one or more buffers, wherein said one or more buffers operate to represent one or more data structures in a mainframe computing environment in the heterogeneous computing environment. Also, the transactional system can provide a transactional adaptor, which operates to convert one or more data elements between said one or more data structures in the mainframe computing environment and said one or more buffers in the transactional system.

20 Claims, 7 Drawing Sheets

(56) References Cited

OTHER PUBLICATIONS

BEA: "BEA eLink Data Integration Option User Guide", BEA eLink Data Integration Option 1.3, Document Edition 1.3, Jan. 2000, Copyright © 2000 BEA Systems, Inc. All Rights Reserved, 98 pages.

Oracle: Oracle® Tuxedo Programming an Oracle Tuxedo ATMI Application Using FML 12c Release 1 (12.1.1), Jun. 2012, Copyright © 1996, 2012, 138 pages.

* cited by examiner

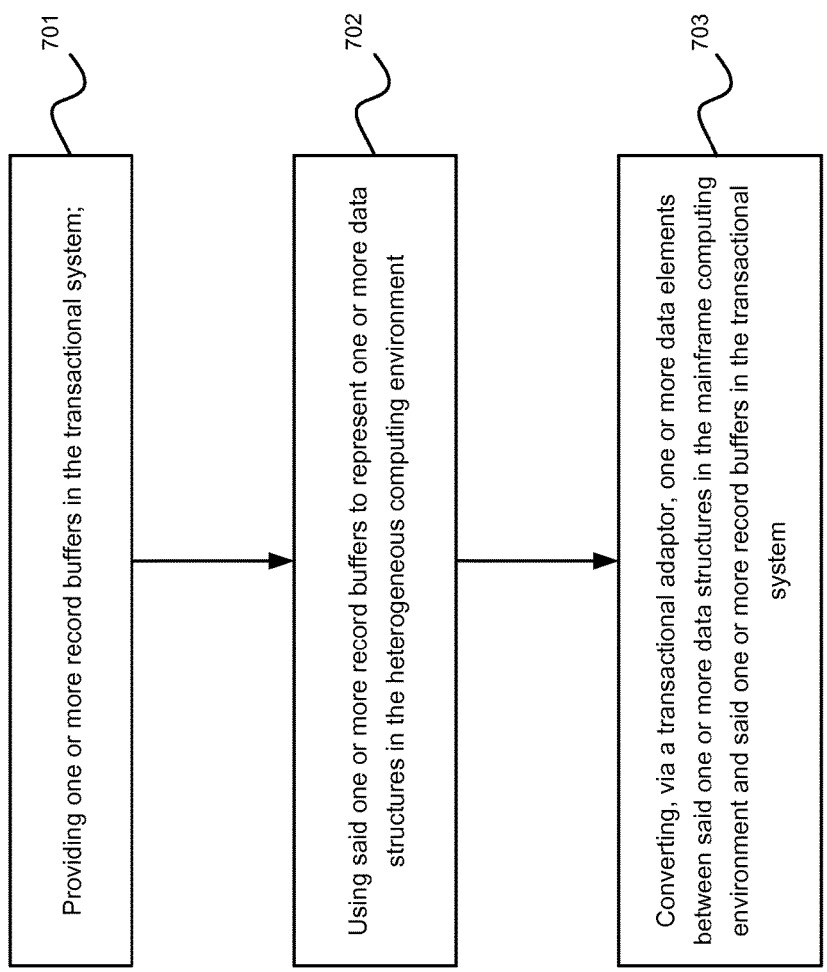

SYSTEM AND METHOD FOR SUPPORTING DATA TYPE CONVERSION IN A HETEROGENEOUS COMPUTING ENVIRONMENT

CLAIM OF PRIORITY

This application claims priority on U.S. Provisional Patent Application No. 61/971,273, filed Mar. 27, 2014 entitled "RECORD BUFFER TYPE FOR COBOL COPYBOOK" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting a transactional system in a heterogeneous computing environment.

BACKGROUND

A transactional system includes enterprise application servers that can process various transactions within an organization. With the developments in new technologies such as high performance network and multiprocessor computers, there is a need to further improve the performance of transactional system. These are the generally areas that embodiments of the invention are intended to address.

SUMMARY

Described herein are systems and methods that can support a transactional system in a heterogeneous computing environment. The transactional system can provide one or more buffers, wherein said one or more buffers operate to represent one or more data structures in a mainframe computing environment in the heterogeneous computing environment. Also, the transactional system can provide a transactional adaptor, which operates to convert one or more data elements between said one or more data structures in the mainframe computing environment and said one or more buffers in the transactional system.

BRIEF DESCRIPTION OF THE FIGURES

FIG. 7 shows an illustration of an exemplary flow chart for supporting data type conversion in a heterogeneous computing environment, in accordance with an embodiment of the invention.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo system as an example for a transactional system. It will be apparent to those skilled in the art that other types of transactional systems can be used without limitation.

Described herein are systems and methods that can support a transactional system in a heterogeneous computing environment.

Data Type Conversion in a Heterogeneous Computing Environment

Various applications in a heterogeneous computing environment can communicate with each other using different protocols across networks.

For example, COBOL, a programming language that is mainly used in the mainframe computing environment, uses copybooks to define the data structures. In COBOL, a copybook file can be used to define the data elements that may be referenced by the mainframe programs. The COBOL record description format is flexible and supports various functionalities such as groups, variable-sized tables, REDEFINES relationships.

A copybook may include one or more copybook record elementary items and one or more copybook record group items. A copybook record elementary item is a data item of a record that does not have subordinate data items (i.e. the elementary items are not further subdivided). A copybook record group item includes one or more subordinate data items. Within one hierarchy of the data items, an elementary item may not belong to more than one group items. Also, a group may contain one or more subgroups.

Furthermore, the heterogeneous computing environment can include a transactional system (such as the Oracle Tuxedo system), which can use various buffers for supporting different features. For example, the Oracle Tuxedo ATMI clients use the typed buffers, which are the memory areas with different categories (or types), to send messages to the ATMI servers. In the Tuxedo system, a typed buffer may optionally be associated with one or more subcategories (or subtypes).

Figure 1:
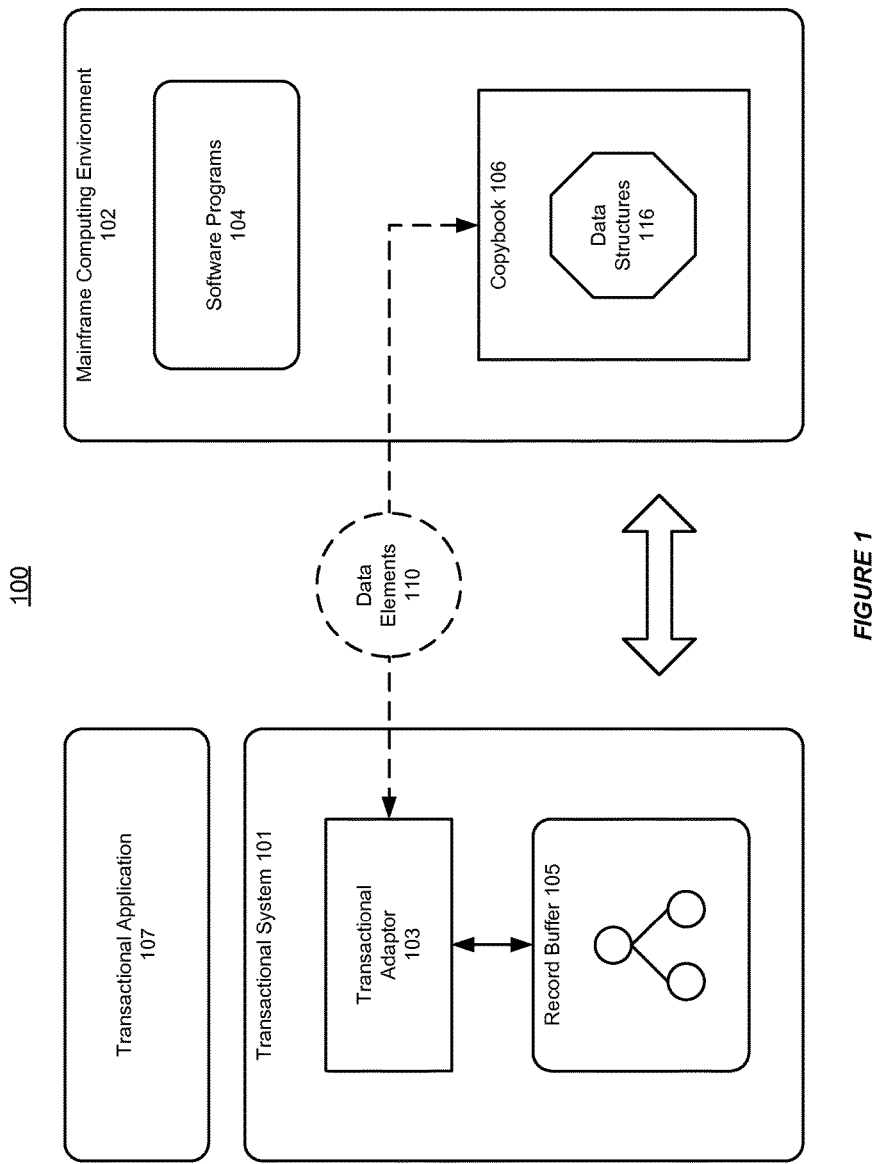
FIG. 1 shows an illustration of supporting interactions between various applications in a heterogeneous computing environment, in accordance with an embodiment of the invention.

FIG. 1 shows an illustration of supporting interactions between transactional applications in a heterogeneous computing environment, in accordance with an embodiment of the invention. As shown in FIG. 1, a transactional system 101 in the heterogeneous computing environment 100 can interact with various software programs 104 that are deployed in a mainframe computing environment 102.

For example, the mainframe software programs 104 can use a copybook 106 for defining one or more data structures 116 that are used by the mainframe software programs 104.

In accordance with an embodiment of the invention, the transactional system 101 can use a record buffer 105 to represent various data structures 116 in the mainframe computing environment (such as the records in the copybook 106).

As shown in FIG. 1, the record buffer 105 can use a tree structure (in memory) to map the COBOL record definition in the copybook 106. Also, data can be transferred between the record buffer 105 and the copybook 106.

In accordance with an embodiment of the invention, the source data can be automatically converted into the type of the destination data. For example, the transactional system 101 can use an adaptor 103, e.g. a Tuxedo mainframe adapter (TMA), to automatically convert one or more data elements 110 between the mainframe computing environment 102 and the transactional system 101.

Additionally, the transaction application 107 can directly access and manipulate the data in the record buffer 105.

Figure 2:
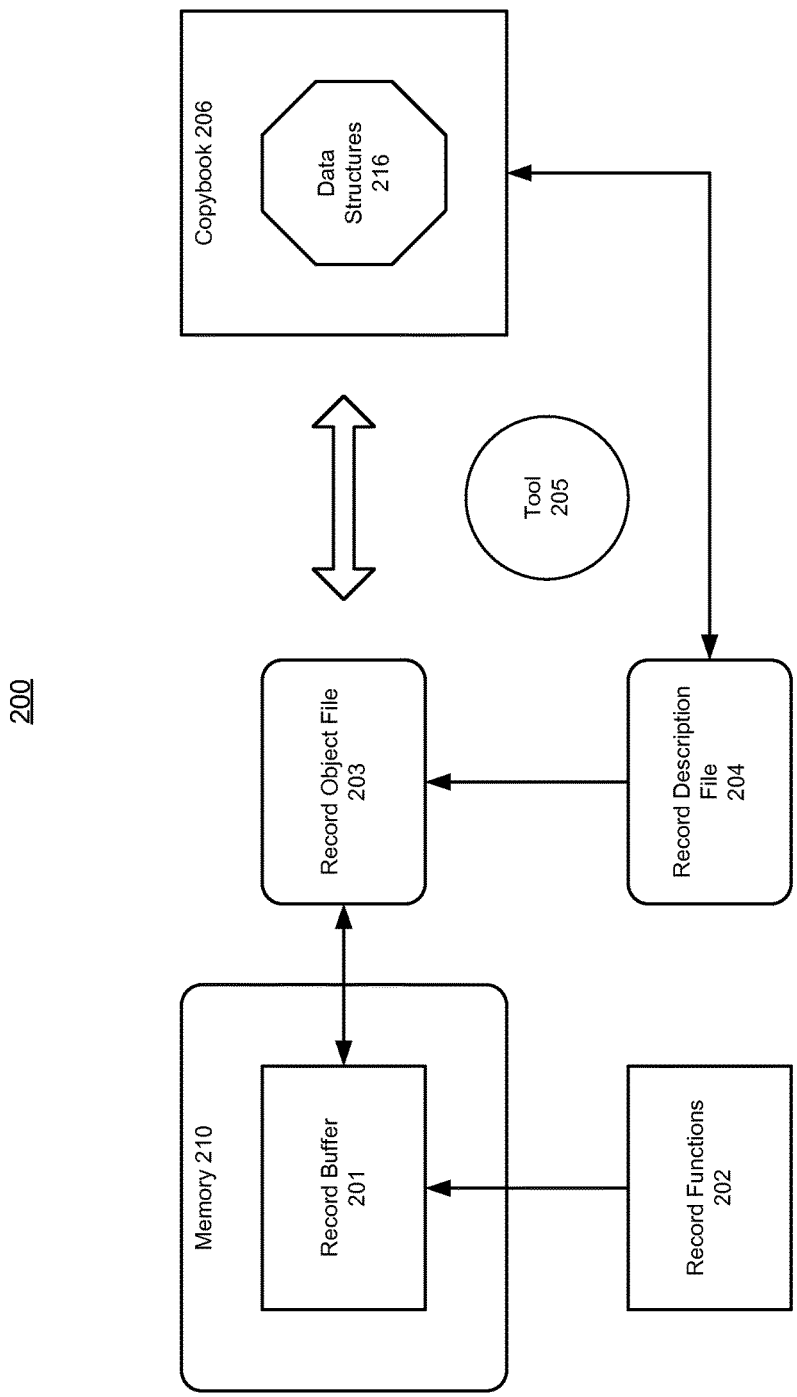
FIG. 2 shows an illustration of supporting data type conversion in a heterogeneous computing environment, in accordance with an embodiment of the invention.

FIG. 2 shows an illustration of supporting data type conversion in a heterogeneous computing environment, in accordance with an embodiment of the invention. As shown in FIG. 2, a heterogeneous computing environment 200 can support data type conversion between a copybook 206 in a mainframe computing environment and a record buffer 201 in a transactional system.

In accordance with an embodiment of the invention, the transactional system can use a tool 205 to convert a COBOL copybook 206 to a record object file 203, which may be used by the transaction applications at runtime.

As shown in FIG. 2, the converting tool 205 can generate a record description file 204 from the COBOL copybook 206 (for the data structures 216). Furthermore, the converting tool 205 can generate the record object file 203 based on the record description file 204. At runtime, the record description 204 can be used for accessing and manipulating the record buffer 201 structures, which maps the COBOL copybook definition as represented in the record object file 203.

For example, Tuxedo can use a cpy2record tool to compile the source record description 204 to create a record object file 203, which is in a binary format. At runtime, Tuxedo can use the record object files 203 based on the configurations in the RECORDFILES and RECORDDIR environment variables. The RECORDFILES variable contains a comma-separated list of object record files for the application. The RECORDDIR variable can specify a colon-separated list of directories that can be used to find the RECORD object files with relative filenames. Thus, Tuxedo applications, which use the C programming language, can take advantage of the record description 204 of the copybook 206 in the COBOL programming language.

In accordance with an embodiment of the invention, the converting tool 205 can parse the copybook record type into a syntax tree with a plurality of nodes, based on different parsing rules.

For example, the nodes in the syntax tree can contain different Tuxedo VIEW and RECORD information. Also, Tuxedo can use the DigitParseRule for handling the external decimal type in a COBOL (e.g. S9999), which may be converted to the Tuxedo VIEW integer and RECORD RTYPE_DIGIT types. Additionally, Tuxedo can use the Comp3ParseRule for handling the internal decimal type in a COBOL (i.e. PACKED-DECIMAL, e.g. S9999 COMP-3), which can be converted to the Tuxedo dec_t types. Furthermore, Tuxedo can use a RecordfileGenerator for creating various record items. The RecordfileGenerator can ensure that the structures of various record items (such as offset/type) are calculated and configured correctly.

As shown in FIG. 2, the system can provide a set of record functions 202 for directly defining, accessing and manipulating the record buffer 201 in memory 210. For example, the Tuxedo record functions 202 can include a function to initialize the allocated RECORD buffer (e.g. a Rinit( ) function). Also, the record functions 202 can include a function to retrieve an item or whole record from a RECORD buffer (e.g. a Rget( )function). Using the Rget( )function, the source data in RECORD is automatically converted into the type of the destination data. Additionally, the record functions 202 can include a function to set an item or whole record to a RECORD buffer (e.g. a Rset( )function).

In accordance with an embodiment of the invention, the record functions 202 can support error handling by returning one or more error values. For example, an error condition can be indicated by the returning of an otherwise impossible value (e.g. a value −1). In Tuxedo, the error message may be displayed with an error number that is defined in Ferror. Additionally, Tuxedo can provide a F_error( )function, which can produce a message on the standard error output. Also, Tuxedo can provide a Fstrerror( )function, which can retrieve the text of an error message from a message catalog.

Figure 3:
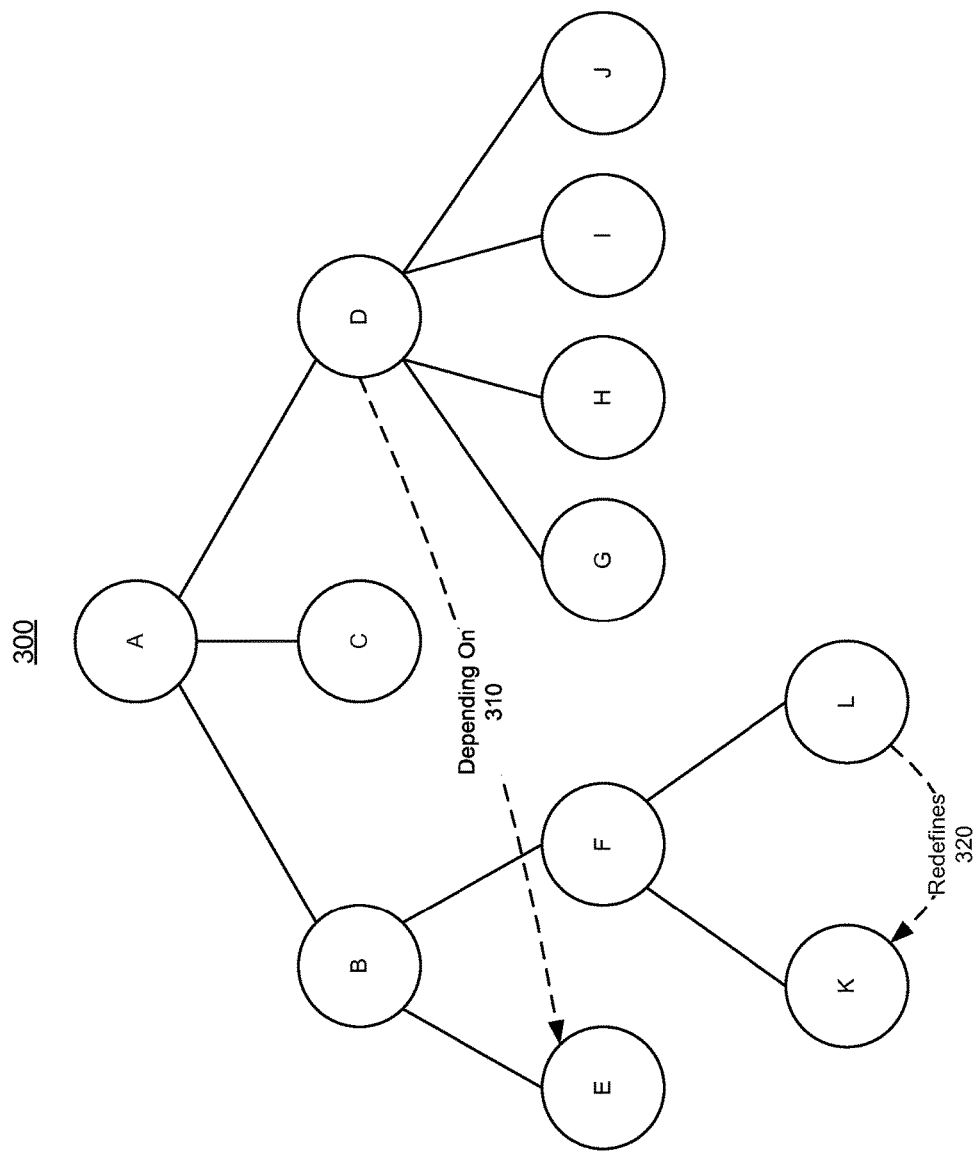
FIG. 3 shows an illustration of a copybook record object description, in accordance with an embodiment of the invention.

FIG. 3 shows an illustration of a copybook record object description, in accordance with an embodiment of the invention. As shown in FIG. 3, a tree 300, which includes nodes A-J, can be used for representing the record object description for a copybook that is shown in the following List 1.

List 1

```
01  A.
    05  B.
        10  E   PIC S9(9) COMP-5.
        10  F.
            15  K   PIC X(4).
            15  L   REDEFINES K PIC S9(8) COMP.
    05  C   PIC S9(4).
    05  D   OCCURS 10 TIMES DEPENDING ON E.
        10  G   PIC S9999 SIGN LEADING.
        10  H   PIC S9(5)V9(2) PACKED-DECIMAL
        10  I   USAGE COMP-1.
        10  J   PIC X(10).
```

As shown in FIG. 3, the hierarchy structure of the tree 300 represents the relationship in the copybook in the above List 1. Furthermore, each of the nodes A-J in the tree 300 represents a field in the copybook. For example, the nodes E, F, and K in tree 300 are under the node B, which represent that the fields E, F, and K are under the group B in the copybook.

Moreover, the tree 300 includes a link 310, which indicates that the node D depends on the node E. The link 310 can be used to represent a variable-length table, which is defined using an OCCURS DEPENDING ON (ODO) clause (D OCCURS 10 TIMES DEPENDING ON E) in an odolink field of the filed D.

Additionally, the tree structure 300 includes a link 320, which is defined using a redefinelink field of the filed L that points to the filed K. The link 320 can be used to support the REDEFINES clause, "L REDEFINES K" in the above List 1, which indicates that different data descriptions (i.e. the fields L and K) may describe the same computer storage area.

Figure 4:
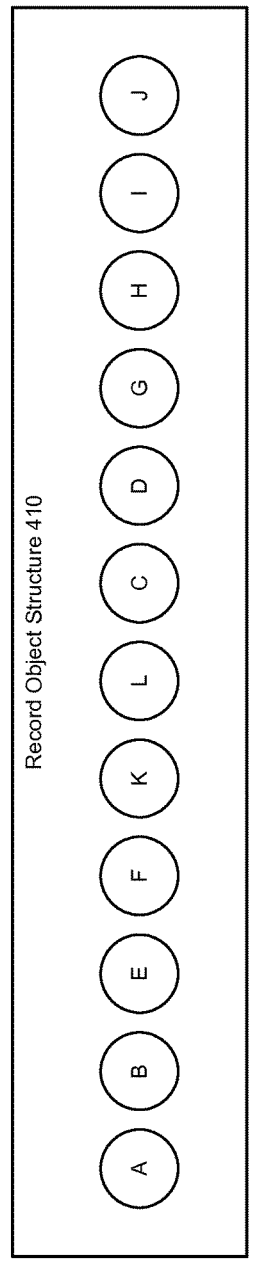
FIG. 4 shows an illustration of using a serialized tree for supporting a record object structure, in accordance with an embodiment of the invention.

FIG. 4 shows an illustration of using a serialized tree for supporting the record object structure, in accordance with an embodiment of the invention. As shown in FIG. 4, a serialized tree 410, which corresponds to the tree 300 (as shown in FIG. 3), can include a plurality of nodes (e.g. the nodes A-J).

In accordance with an embodiment of the invention, the record object structure 400, which is implemented using the serialized tree 410 in the record object file and/or in the memory, can be used to represent the copybook record.

Additionally, the nodes A-J may be pre-ordered in the record object structure 410. As shown in FIG. 4, the nodes A-J can be based on the depth-first scheme.

Tuxedo can use a tree data structure for representing the RECORD object description in memory. Using the serialized tree 410, the memory layout of RECORD in Tuxedo can be contiguous, which mirrors the copybook layout. Thus, the Tuxedo applications can easily manipulate the RECORD buffer, based on the RECORD description provided.

In accordance with an embodiment of the invention, each of the nodes A-J in the serialized tree 410 represents a record item. For example, the Tuxedo RECORD structure can be associated with multiple RECORDITEM elements, each of which can be defined using a C structure as shown in the following List 2.

List 2

```
struct RECORDITEM {
    unsigned int rname;       /* offset to data item name in string pool */
    unsigned short rhash;     /* hash value of the data item name */
    unsigned int vname;       /* offset to corresponding view name in string pool */
    unsigned short type;      /* data type number */
    unsigned int flag;        /* flag options in bit pattern (the meaning type dependent) */
    unsigned int count;       /* # of occurrence of the data item */
    unsigned int mincount;    /* minimum occurrence of the data item */
    unsigned int maxcount;    /* maximum occurrence of the data item */
    unsigned int odolink;     /* link to OCCURS DEPENDING ON item */
    unsigned int rerulelink;  /* link to redefine rule */
    unsigned int redfinelink; /* link to REDEFINES item */
    unsigned int size;        /* size of the item */
    unsigned int offset;      /* offset of the item to beginning of the buffer */
    unsigned int plink;       /* link to parent */
    unsigned int clink;       /* link to child */
    unsigned int fslink;      /* link to forward sibling */
    unsigned int bslink;      /* link to backward sibling */
    unsigned int rec_flds[4]; /* Unused. Reserve for future extension */
};
```

Additionally, the various record items A-J can be associated with different types, which corresponds to the different copybook data types. The following List 3 shows different types of Tuxedo RECORDITEM elements.

List 3

| | | | |
|---|---|---|---|
| #define | RTYPE_RECORD | 0 | /* RECORD or group */ |
| #define | RTYPE_DIGIT | 1 | /* external decimal */ |
| #define | RTYPE_UDIGIT | 2 | /* unsigned external decimal */ |
| #define | RTYPE_FLOAT | 3 | /* single-precision float */ |
| #define | RTYPE_DOUBLE | 4 | /* double-precision float */ |
| #define | RTYPE_LONG | 5 | /* long - 8 bytes */ |
| #define | RTYPE_ULONG | 6 | /* unsigned long */ |
| #define | RTYPE_INT | 7 | /* int - 4 bytes */ |
| #define | RTYPE_UINT | 8 | /* unsigned int */ |
| #define | RTYPE_SHORT | 9 | /* short - 2 bytes */ |
| #define | RTYPE_USHORT | 10 | /* unsigned short */ |

-continued

List 3

| | | | |
|---|---|---|---|
| #define | RTYPE_DEC | 11 | /* decimal, dec_t */ |
| #define | RTYPE_STRING | 12 | /* string - null terminated */ |
| #define | RTYPE_CARRAY | 13 | /* character array */ |

Figure 5:
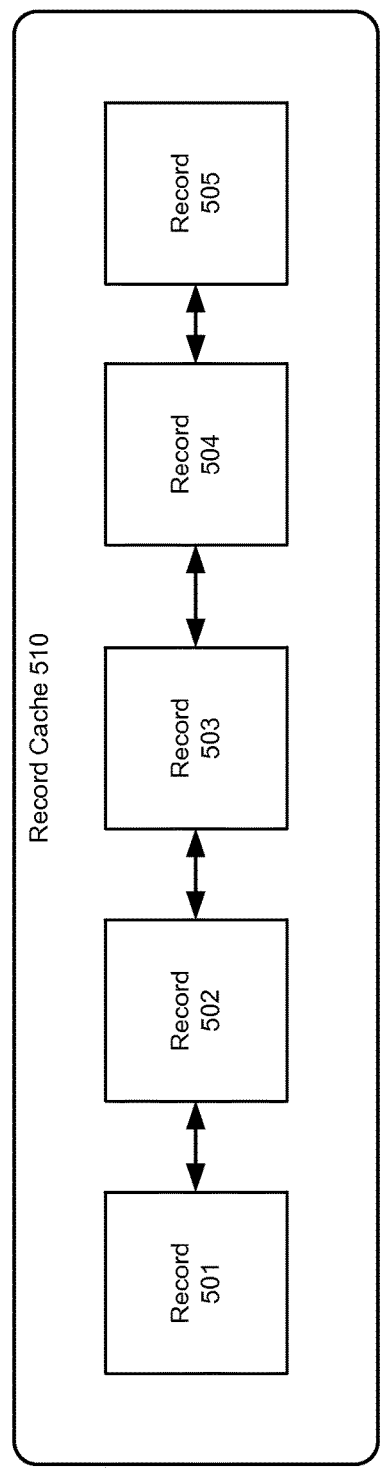
FIG. 5 shows an illustration of supporting a record cache, in accordance with an embodiment of the invention.

FIG. 5 shows an illustration of a record cache, in accordance with an embodiment of the invention. As shown in FIG. 5, a transactional system 500 can use a record cache 510 for maintaining the different records 501-505. In Tuxedo, the record cache 510 can be created to store the summary information for different RECORDs and the pointers to access each RECORD at runtime.

In accordance with an embodiment of the invention, the record cache 510 can be implemented using a double linked list format. For example, the size of the Tuxedo RECORD cache may be controlled by a configuration variable, FRECORDCACHESIZE (with a default size of 128).

The following List 4 defines the structure of the Tuxedo RECORD cache.

List 4

```
#define FRECORDNAMESIZE 32
struct RECORDTBL {
    char rname[FRECORDNAMESIZE]; /* name of record */
    unsigned int totsize;   /* total size of RECORD */
    unsigned int nitems;    /* # of items in the RECORD */
    unsigned short last;    /* link to last RECORD */
    unsigned short next;    /* link to next RECORD */
    char *recordptr;        /* ptr to RECORD */
};
```

Additionally, the record cache 510 can use the least recent used (LRU) algorithm to determine which record may be discarded, when the record cache 510 is full.

Figure 6:
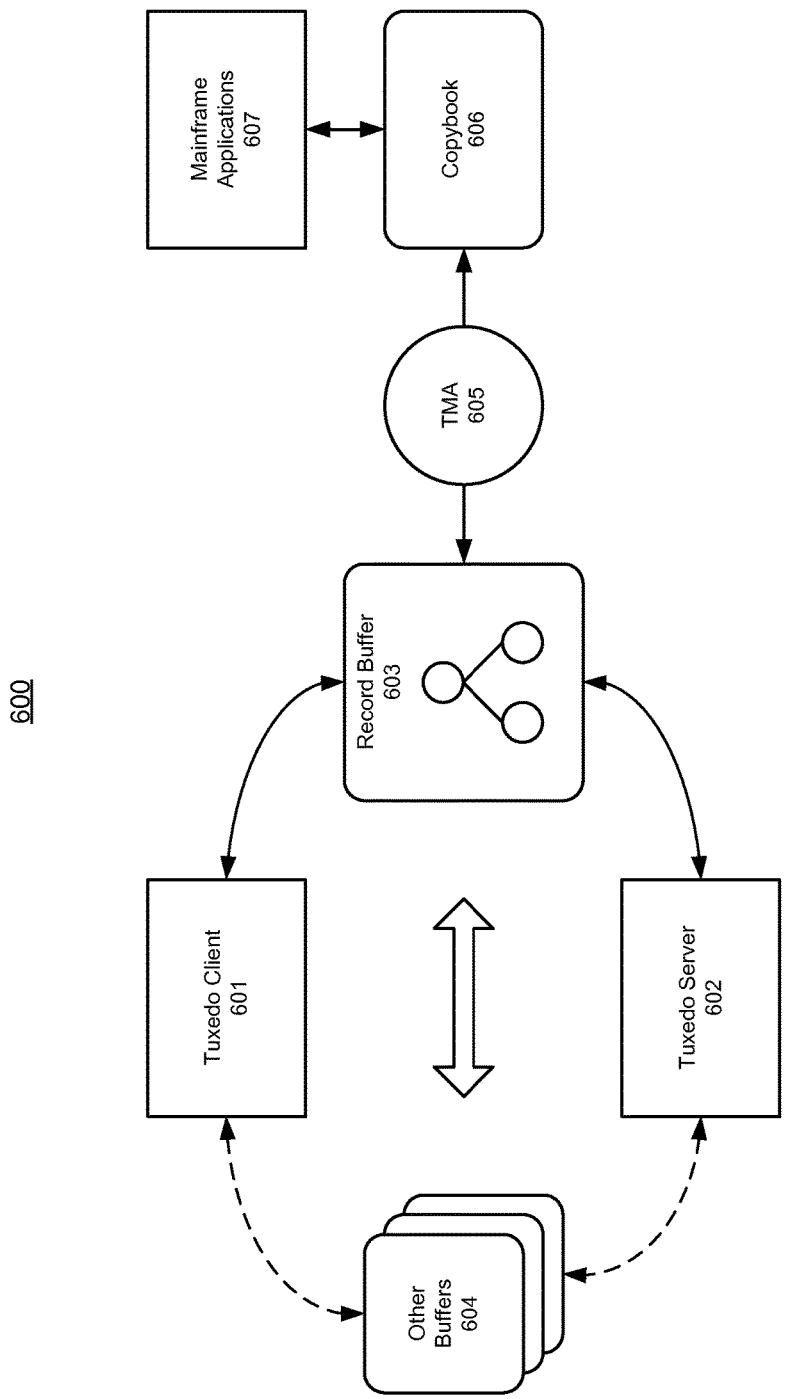
FIG. 6 shows an illustration of supporting various transactional processes in a heterogeneous computing environment, in accordance with an embodiment of the invention.

FIG. 6 shows an illustration of supporting various transactional processes in a heterogeneous computing environment, in accordance with an embodiment of the invention. As shown in FIG. 6, a heterogeneous computing environment 600 can include various transactional processes (or processors), such as a Tuxedo client 601 and a Tuxedo server 602, which can interact with one or more mainframe applications 607.

For example, the mainframe applications 607 can be based on the customer information control system/extended system architecture (CICS TS) and information management system (IMS) interfaces or other application program-to-program communication (APPC) or CICS TS interfaces.

As shown in FIG. 6, an adaptor, such as an Oracle Tuxedo Mainframe Adapter (TMA) 605, can be used to support the communication between the mainframe applications 607 and the Tuxedo processes (or processors) 601 and 602. The TMA 605 can use the communications resource manager (CRM) for managing communications resources. The CRM can coordinate the flow of data between applications running on an ATMI platform and applications running on a mainframe.

In accordance with an embodiment of the invention, the heterogeneous computing environment 600 can support data type conversion between a copybook 606 that is used by the mainframe applications 607 and a record buffer 603 (e.g. a RECORD typed buffer) that is used by the transactional processes (or processors) 601-602.

As shown in FIG. 6, the domain-based TMA 605 allows the data to be automatically converted between the record buffer 603 and the copybook 606. Thus, the TMA 605 can provide bi-directional connectivity between the various Tuxedo processes 601-602 and the mainframe applications 607.

For example, Tuxedo can use the record buffer 603 for representing the copybook record 606. The record buffer 603 types can have subtypes that represent the individual record structures. Thus, Tuxedo can take advantage of the COBOL copybook 606 after it is converted into the record buffer 603, since the record buffer 603 provides access to the COBOL copybook 606. Also, the Tuxedo client 601 and the Tuxedo server 602 can use the data structure as described in the record buffer 603 based on the RECORD description file.

Moreover, Tuxedo allows the transferring of data between the record buffer 603 and other buffer structures (such as the Tuxedo FML/VIEW buffers 604 based on the C language structures). For example, Tuxedo can use the Fvrtos( )function to convert the record buffer 603 into the FML/VIEW buffers 604. Also, Tuxedo can use the Fvstor( )function to convert the FML/VIEW buffers 604 into the record buffer 603.

In accordance with an embodiment of the invention, the conversion between the source data and the destination data can be automatically. For example, the data in the record buffer 603 uses the format that maintains the COBOL internal representation. When the Rget( )function is invoked, data is automatically converted into the data type in the C language structures. When the Rset( )function is invoked, data is automatically converted from the C language structures into the COBOL internal representation.

Alternatively, the TMA 605 can convert the copybook 606 directly into other buffer structures, such as the Tuxedo VIEW/VIEW32 buffers 604. The VIEW/VIEW32 may not be able to represent all the information of copybook correctly. Also, a user may not be able to manipulate these buffer structures directly. Additionally, if each group in the copybook 606 is translated to a VIEW, the system may results in a large number of VIEWs.

Additionally, Tuxedo can take advantage of different types of buffers, such as the CARRAY/FML/FML32/STRING/VIEW/VIEW32 buffers. Each buffer can be designated as a specific type. Additionally, the different types of buffers may require different routines to initialize, send and receive messages. Also, the different types of buffers may require different routines to encode and decode data. Tuxedo can call an appropriate routine automatically for a specific type without programming intervention.

FIG. 7 illustrates an exemplary flow chart for supporting data type conversion in a heterogeneous computing environment, in accordance with an embodiment of the invention. As shown in FIG. 7, at step 701, the system can provide one or more record buffers in the transactional system in the heterogeneous computing environment. Furthermore, at step 702, the system can use said one or more record buffers to represent one or more data structures in the heterogeneous computing environment. Then, at step 703, a transactional adaptor can convert one or more data elements between said one or more data structures in the mainframe computing environment and said one or more record buffers in the transactional system.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting transactions between different platforms in a heterogeneous computing environment, comprising:
   one or more microprocessors;
   a transactional system running on the one or more microprocessors, the transactional system including a memory having a record buffer; and
   a transactional adaptor running on the one or more microprocessors, wherein said transactional adaptor operates to:
      parse a data structure of a mainframe computer into a syntax tree, the syntax tree having a plurality of nodes, each node representing a data field of the data structure of the mainframe computer, the syntax tree representing relationships between the nodes;
      generate a record description file based on the syntax tree, wherein the record description file describes the data structure of the mainframe computer; and
      compile, from the record description file, a record object in the record buffer of the transactional system, wherein the record object represents the data structure of the mainframe computer described in the record description file; and
   wherein said transactional system operates to:
      access the record object according to the description of the data structure of the mainframe computer of the record description file; and
      manipulate the record object.

2. The system of claim 1, wherein:
   the data structure of the mainframe computer is defined in a copybook in the mainframe computing environment.

3. The system of claim 1, wherein:
   said transactional adaptor operates to use a tree structure to represent the data structure of the mainframe computer described in the record description file.

4. The system of claim 1, wherein:
   said transactional adaptor operates to use a serialized tree to maintain said record object in the record buffer.

5. The system of claim 1, further comprising:
a record cache that operates to maintain said fields in said record buffer.

6. The system of claim 1, wherein:
the transactional system operates to use one or more record functions to manipulate said record object in the record buffer.

7. The system of claim 1, wherein the transactional adapter operates to generate a record object file, wherein the record object file represents the data structure of the mainframe computer described in the record description file.

8. The system of claim 7, the transactional system further comprising a first system variable, the first system variable comprising a list including the record object file and a plurality of other record object files.

9. The system of claim 8, the transactional system further comprising a second system variable, the second system variable comprising a list of directories that store the record object files and the plurality of other record object files.

10. The system of claim 9, wherein an application running on the transactional system uses the first and second system variables to identify an appropriate record object for the application.

11. A method for supporting transactions between different platforms in a heterogeneous computing environment, comprising:
parsing, by a transactional adapter, a data structure of a mainframe computer into a syntax tree, the syntax tree having a plurality of nodes, each node representing a data field of the data structure of the mainframe computer, and the syntax tree representing relationships between the nodes;
generating a record description file based on the syntax tree, wherein the record description file describes the data structure of the mainframe computer;
compiling, by the transactional adapter and from the record description file, a record object in a record buffer of a transactional system, wherein the record object represents the data structure of the mainframe computer described in the record description file;
accessing, by the transactional system, the record object according to the description of the data structure of the mainframe computer of the record description file; and
manipulating, by the transactional system, the record object.

12. The method of claim 11, wherein the data structure of the mainframe computer is defined in a copybook in the mainframe computing environment.

13. The method of claim 11, further comprising:
using, via said transactional adaptor, a tree structure to represent the data structure of the mainframe computer described in the record description file.

14. The method of claim 11, further comprising:
using, via said transactional adaptor, a serialized tree to maintain said record object in the record buffer.

15. The method of claim 11, further comprising:
using a record cache to maintain said fields in said record buffer.

16. The method of claim 11, further comprising:
using, via the transactional system, one or more record functions to manipulate said record object in the record buffer.

17. The method of claim 11, further comprising:
creating, via said transactional adaptor, a record object file, wherein the record object file represents the data structure of the mainframe computer described in the record description file.

18. The method of claim 17, further comprising:
providing a first system variable, the first system variable comprising a list including the record object file and a plurality of other record object files.

19. The method of claim 18, further comprising:
providing a second system variable, the second system variable comprising a list of directories that store the record object files and the plurality of other record object files.

20. A non-transitory machine readable storage medium having instructions stored thereon that when executed cause a system to perform the steps comprising:
parsing, by a transactional adapter, a data structure of a mainframe computer into a syntax tree, the syntax tree having a plurality of nodes, each node representing a data field of the data structure of the mainframe computer, and the syntax tree representing relationships between the nodes;
generating a record description file based on the syntax tree, wherein the record description file describes the data structure of the mainframe computer;
compiling, by the transactional adapter and from the record description file, a record object in a record buffer of a transactional system, wherein the record object represents the data structure of the mainframe computer described in the record description file;
accessing, by the transactional system, the record object according to the description of the data structure of the mainframe computer of the record description file; and
manipulating, by the transactional system, the record object.

* * * * *

UNITED STATES PATENT AND TRADEMARK OFFICE
CERTIFICATE OF CORRECTION

PATENT NO. : 10,097,660 B2
APPLICATION NO. : 14/639266
DATED : October 9, 2018
INVENTOR(S) : Cai et al.

Page 1 of 1

It is certified that error appears in the above-identified patent and that said Letters Patent is hereby corrected as shown below:

In the Claims

In Column 9, Line 2, in Claim 5, after "said" insert -- data --.

Signed and Sealed this
Second Day of March, 2021

Drew Hirshfeld
*Performing the Functions and Duties of the
Under Secretary of Commerce for Intellectual Property and
Director of the United States Patent and Trademark Office*